(12) United States Patent
Takahashi et al.

(10) Patent No.: US 6,346,680 B1
(45) Date of Patent: Feb. 12, 2002

(54) WEIGHT AND FORM SENSING APPARATUS AND A PACKAGING MACHINE USING THE SAME

(75) Inventors: Atsushi Takahashi; Akira Kudo, both of Yokohama (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/576,965

(22) Filed: May 24, 2000

(30) Foreign Application Priority Data

May 24, 1999 (JP) .......................... 11-143320
May 17, 2000 (JP) .......................... 12-144420

(51) Int. Cl.[7] .................. G01G 19/00; G01G 3/14; G01B 7/32; B25J 19/00; G01D 7/00
(52) U.S. Cl. .................. 177/1; 177/199; 177/210 R; 33/123; 73/862.046; 901/46; 53/52
(58) Field of Search .................. 33/121, 122, 123, 33/1 V, 124; 73/862.046; 177/199, 200, 210 R, 210 C, 1, 245; 901/46; 53/52

(56) References Cited

U.S. PATENT DOCUMENTS 4,208,648 A * 6/1980 Naumann ............... 901/46
5,010,744 A * 4/1991 Kikuo et al. ............ 73/862.04
5,331,118 A * 7/1994 Jensen .................. 177/25.14

FOREIGN PATENT DOCUMENTS

| JP | 0243312 | * 10/1986 | ............ 33/121 |
| JP | 3-501221 | * 3/1991 | |
| JP | 6-294630 | 10/1994 | |
| WO | WO 89/02727 | 4/1989 | |

* cited by examiner

Primary Examiner—Randy W. Gibson
(74) Attorney, Agent, or Firm—Oblon, Spivak, McClelland, Maier & Neustadt, P.C.

(57) ABSTRACT

A weight and form sensing apparatus according to the present invention provides weight sensors on a base, in matrix pattern for instance. Each weight sensor has a load receiving portion on a top. Weight and form can be sensed by single weight and form sensing apparatus according to the present invention. That is, output values of the weight sensors are summed, so that an article put on the weight sensors can be detected. Also, the existence of the load on each weight sensor is determined based on output signal of each weight sensor, so that the bottom form and size of the article can be identified. The weight and form sensing apparatus according to the present invention can be preferably arranged into a feeding stream of the article because an arrangement of the sensors for identifying the form and size of the article does not interfere an arrangement of the feeding mechanism for the article.

11 Claims, 7 Drawing Sheets

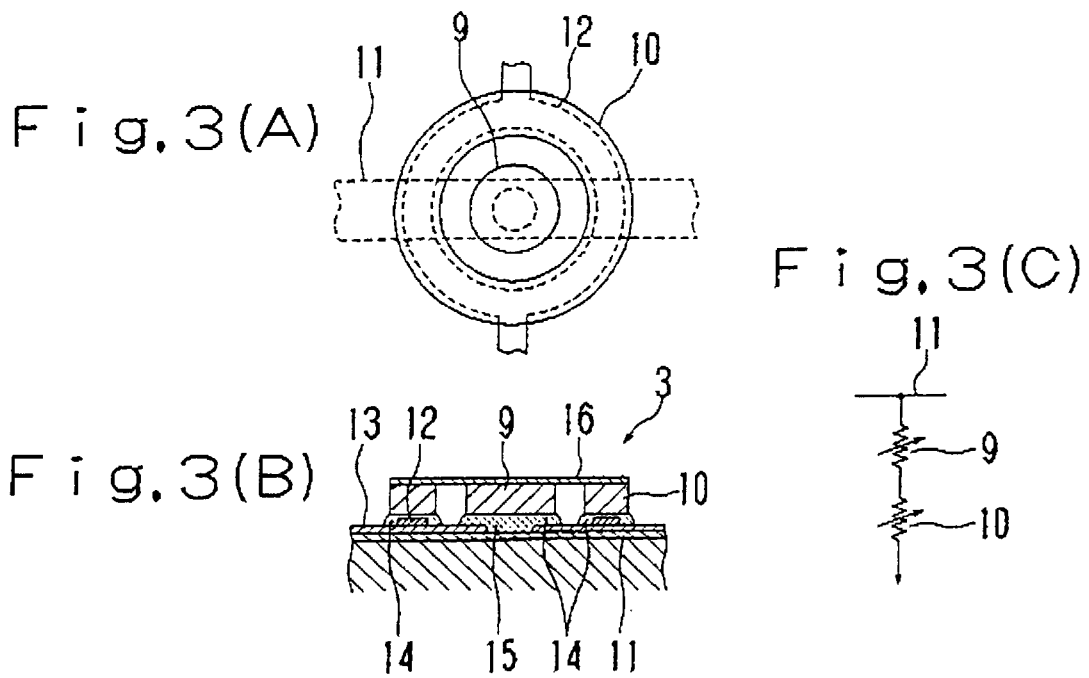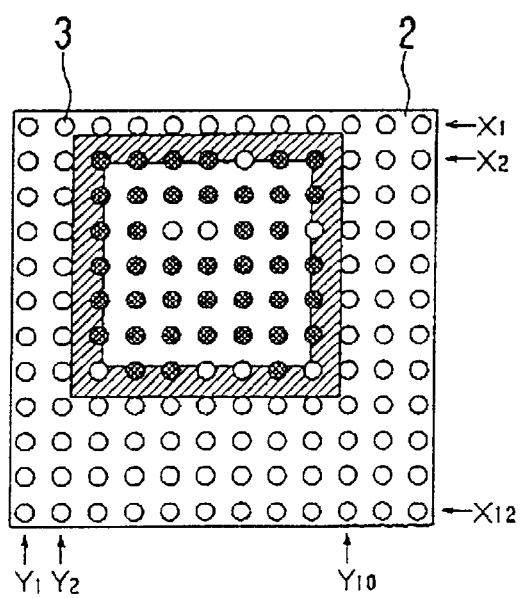

WEIGHT AND FORM SENSING APPARATUS AND A PACKAGING MACHINE USING THE SAME

BACKGROUND OF THE INVENTION

1. Field of the Invention

The present invention relates to a weight and form sensing apparatus and a packaging machine using the same.

2. Description of the Prior Art

An automatic packaging machine, which puts an article such as foods on a tray and packaging the article with a film by packaging operation such as stretching and shrinking the film, is commonly utilized. The packaging machine being able to package the article according to weight and size of the article, so-called stretch packaging machine, is also utilized.

One example for an automatic packaging process of the stretch packaging machine is described below. First, the article, e.g. food with the tray, is put on a conveyance unit of the machine. The article is weighed at the conveyance unit by a balance such as a load cell balance. The article is conveyed to a packaging unit by a conveyance mechanism such as a belt conveyer. The size (height and length) of the tray is measured by sensors such as optical sensors while the article is conveyed. The film having suitable width is selected as to the measured size of the article, selected film is drawn out from a film supply unit with certain amount, a film clamping mechanism clamps the drawn film and stretches the film in width direction of the film, so that the stretch packaging machine waits for packaging operation.

When the article is positioned under the film in the packaging unit, the stretch packaging unit conveys the article upwardly to the waiting film by a lifter. Then, the packaging operation begins when the article touched the film so as to package the article with the film. The packaged article is conveyed towards an outlet. A label, printed necessary matters such as the weight, name of the article and price of the article, is adhered to the article by a labeling machine while the end of the film is melted and curing.

The disadvantage of the above conventional stretch packaging machine is now described. The weight of the article is detected by the balance such as the load cell balance. The size of the article, i.e., the tray, is measured by sensors such as reflect type optical sensors or transmission type optical sensors disposed under a conveyance belt or sides of the conveyance belt in constant interval while the article is conveyed. These sensors should be disposed at places which do not interfere with the conveyance mechanism.

Accordingly, different sensing mechanisms are required for weighing and measuring the article, so that a number or parts for sensing weight and form of the article is large and the mechanism becomes complicated. Also, the sensors for measuring the size of the article should be disposed at the places not interfering with the conveyance mechanism, so that the arrangement of the sensors are limited.

SUMMARY OF THE INVENTION

Accordingly, it is an object of the present invention to be capable of sensing the weight and size of the article with single sensing mechanism.

Another object of the present invention is to provide simple structure for sensing the weight and size of the article.

A further object of the present invention is to eliminate the arrangement for preventing the interference between the sensing mechanism and the conveyance mechanism.

A further object of the present invention is to improve the arrangement of each portion.

These and further object of the present invention are achieved by the novel weight and form sensing apparatus having a base, weight sensors each having a load receiving portion on a top and disposed on the base. The novel apparatus according to the present invention sums output value of each weight sensor, so that an article put on the weight sensors is weighed. The novel apparatus according to the present invention also determines existence of the load on each weight sensor based on output signal of each weight sensor, so that the form and size of the article are identified.

According to the novel packaging machine of the present invention includes a weight and form sensing apparatus comprises a base and weight sensors each having a load receiving portion on a top and disposed on the base. The novel machine according to the present invention sums output value of each weight sensor, so that an article put on the weight sensors is weighed. The novel machine according to the present invention also determines existence of the load on each weight sensor based on output signal of each weight sensor, so that the form and size of the article are identified Then, the article is packaged in a tray with a film after weight and form of the article are sensed by the weight and form sensing apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 3(A) is a plan view illustrating the structure of the weight sensor according to the present invention;

FIG. 3(B) is a vertical section view illustrating the structure of the weight sensor according to the present invention;

FIG. 3(C) is a circuit diagram illustrating equivalent circuit of the weight sensor according to the present invention;

FIG. 4 is a plan view illustrating the arrangement of the weight sensors on the base according to the present invention;

DETAILED DESCRIPTION OF THE PREFERRED EMBODIMENTS

Figure 1:
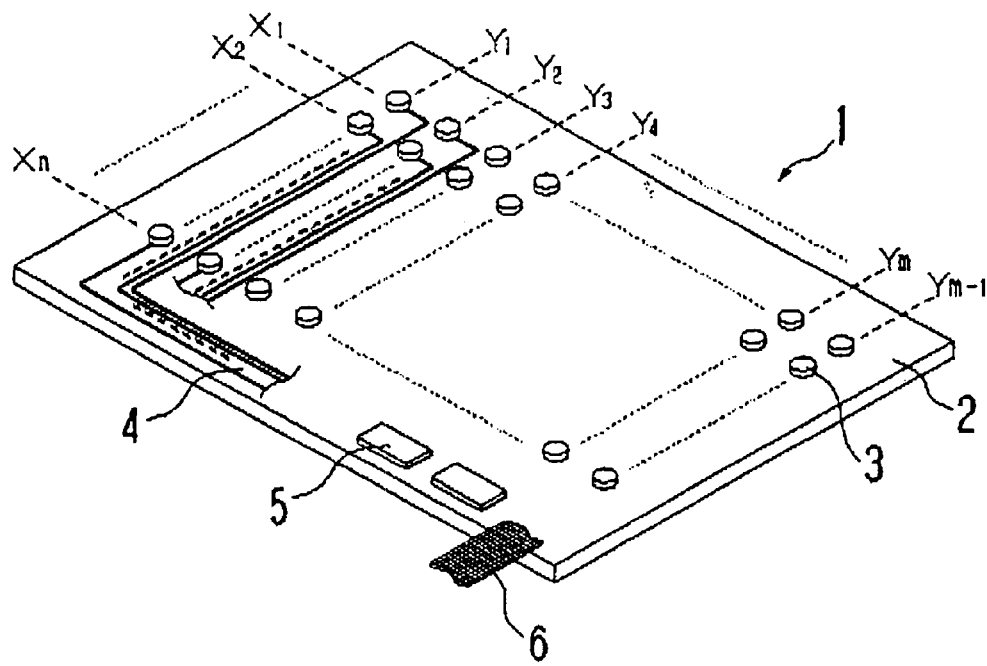
FIG. 1 is a perspective view of the weight and form sensing apparatus according to the present invention.

The embodiments of the weight and form sensing apparatus according to the present invention are now explained with reference to FIGS. 1 to 9. FIG. 1 shows a base 1 of the weight and form sensing apparatus according to the present invention. The base 1 includes a substrate 2. A plurality of weight sensors 3 are arranged on the substrate 2 in a matrix pattern with a predetermined pitch. Each weight sensors 3 connects with an earth, and IC element 5 via a wiring pattern 4 formed in the substrate 2. Each weight sensors 3 also connects with a power source, control unit or the like via a cable 6 provided at the end of the substrate 2.

Figure 2:
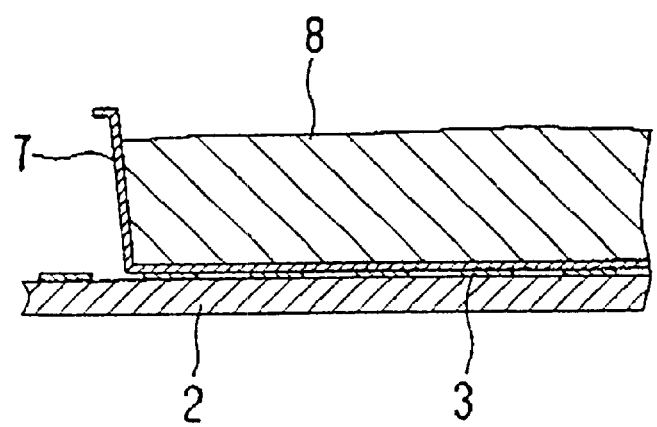
FIG. 2 is an enlarged partial sectional view illustrating a tray on a base according to the present invention.

FIG. 2 shows goods 8 with tray 7 as an article put on the base 1. The load is added to each weight sensor 3, the top of which contacts with bottom of the tray 7. A load receiving portion is provided at the top of the weight sensors 3.

FIGS. 3(A), 3(B) and 3(C) shows a detailed structure of a weight sensor 3. A cylindrical center portion 9 and a cylindrical periphery portion 10 as a conductive elastic member each formed out of conductive rubber are adhered to electrodes 11 and 12 with conductive adhesive 14. 11 designates a common electrode, which forms a part of a wiring pattern 4 of the substrate 2. An insulation layer 13 is formed on the common electrode 11. The common electrode 11 connects with the center portion 9 of the conductive elastic member formed out of the conductive rubber via a contact hole 15 formed in the insulation layer 13. The center portion 9 of the conductive elastic member adheres to the common electrode 11 by the conductive adhesive 14. A pattern of an individual electrode 12 is formed on the insulation layer 13. The pattern of the individual electrode 12 connects with the periphery portion 10 of the conductive elastic member by the conductive adhesive 14. A thin conductive member such as a metal plate 16 adheres to the cylindrical center portion 9 and the cylindrical periphery portion 10 of the conductive elastic member, so that the center portion 9 and the periphery portion 10 of the conductive elastic member are connected with continuity. FIG. 3(C) shows an equivalent circuit of the weight sensor 3. That is, the cylindrical center portion 9 and the cylindrical periphery portion 10 of the conductive elastic member make series connection. The center portion 9 and the periphery portion 10 of the conductive elastic member strain according to load P, which is applied to the metal plate 16, so that the resistance value of each portion 9 and 10 of the conductive elastic member will be changed.

The inner wiring pattern provided in the substrate 2 shown in FIG. 1 can be manufactured with a conventional wiring pattern manufacturing technique. Thus, the detailed description of the same is eliminated.

The operation of the weight and form sensing apparatus is now explained with reference to FIGS. 4 to 9. FIG. 4 abstractly shows a method for sensing the weight and the form with respect to the tray 7 put on the weight sensors 3 in a matrix pattern. The weight sensors 3 are arranged in a 12×12 matrix pattern. The weight sensors 3 with mesh are identified with the one added the load and output signal. The weight sensors 3 connects with a computing unit 20 via signal conditioners $17_1$, $17_2$, ... $17_{12}$, switching circuits $18_1$, $18_2$, ... $18_{12}$, and a switching circuit 20. Thus, the logical operation shown in FIG. 9 is executed according to commands from a reading controller 21 whereby the existence area of the bottom of the tray 7 is detected. Accordingly, the computing unit 20 operates as means for summing output value of each weight sensor 3 to weigh the article put on the weight sensors 3 and means for determining an existence of the article on each weight sensor 3 based on an output signal of each weight sensor 3 to identify a bottom form and size of the Executing the logical operation in the line direction and row direction with respect to all lines and rows, comparing the detected signal from the weight sensors 3 with a coordinate position of the weight sensors 3 whereby the periphery of the tray 7 in the bottom is assumed at the position showing shadow in FIG. 4.

The form of the bottom of the tray 7 is rectangle, but the weight sensors 3 with low level output, shown with a white dot, is included in the line or the row including the weight sensors 3 with high level output, shown with a mesh dot. This means that the bottom of the tray 7 is not completely flat, so some portions of the bottom of the tray 7 step over the weight sensors 3. In case such state occurs, the envelop is provided in the line and row direction whereby the method for sensing the form of the article according to the present invention will be able to assume the existent area of the bottom of tray 7.

Figure 5:
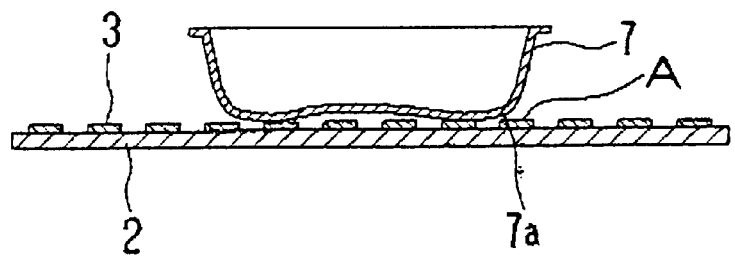
FIG. 5 is a side view illustrating the tray with non-flat bottom on the weight sensors according to the present invention.

For other situation, a protrusion 7a may produce at the bottom inner portion of the tray 7 as shown in FIG. 5 whereby the periphery of the tray 7 in the bottom, which should add the load to the weight sensors 3, cannot add the load to the same A. Thus, the bottom form and size of the tray 7 cannot be sensed correctly in the case.

Figure 6:
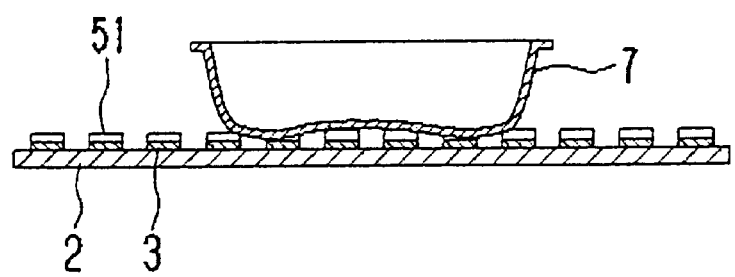
FIG. 6 is a side view illustrating the tray with non-flat bottom on the weight sensors for other embodiment of the present invention.

For other embodiment of the present invention, a flexible member 51 is provided on the top of each weight sensor 3 as shown in FIG. 6. The flexible members 51 have flexibility so as to deform with the load by the tray 7. In case the bottom of the tray 7 had wave so as to produce the protrusion 7a at the bottom inner portion of the tray 7, the protrusion 7a deforms the flexible members 51 provided on the load receiving portion of the weight sensors 3 whereby the periphery of the tray 7 in the bottom will be able to add the load to the load receiving portion of the weight sensors 3. Thus, the bottom form and size or the tray 7 can be sensed correctly even though the bottom of the tray 7 had wave.

Figure 7:
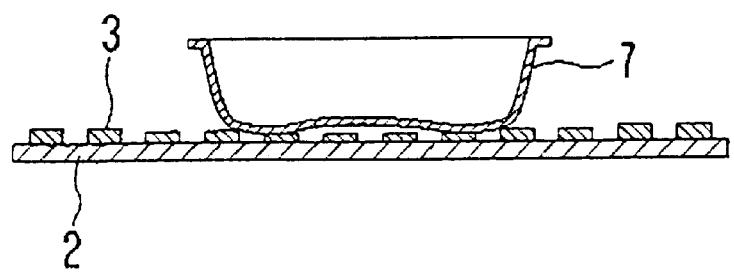
FIG. 7 is a side view illustrating the tray with non-flat bottom on the weight sensors for other embodiment of the present invention.

For another embodiment of the present invention, the weight sensors 3 disposed at center area of the weight sensor arrangement may be formed lower than the weight sensors disposed at an outer area of the weight sensor arrangement as shown in FIG. 7. In case the bottom of the tray 7 had a wave so as to produce the protrusion 7a at the bottom inner portion of the tray 7, the periphery of the tray 7 in the bottom is able to add the load to the load receiving portion of the weight sensors 3 because the protrusion 7a faced to the lower load receiving portions of the weight sensors 3. Thus, the bottom form and size of the tray 7 can be sensed correctly even though the bottom of the tray 7 had a wave.

Figure 8:
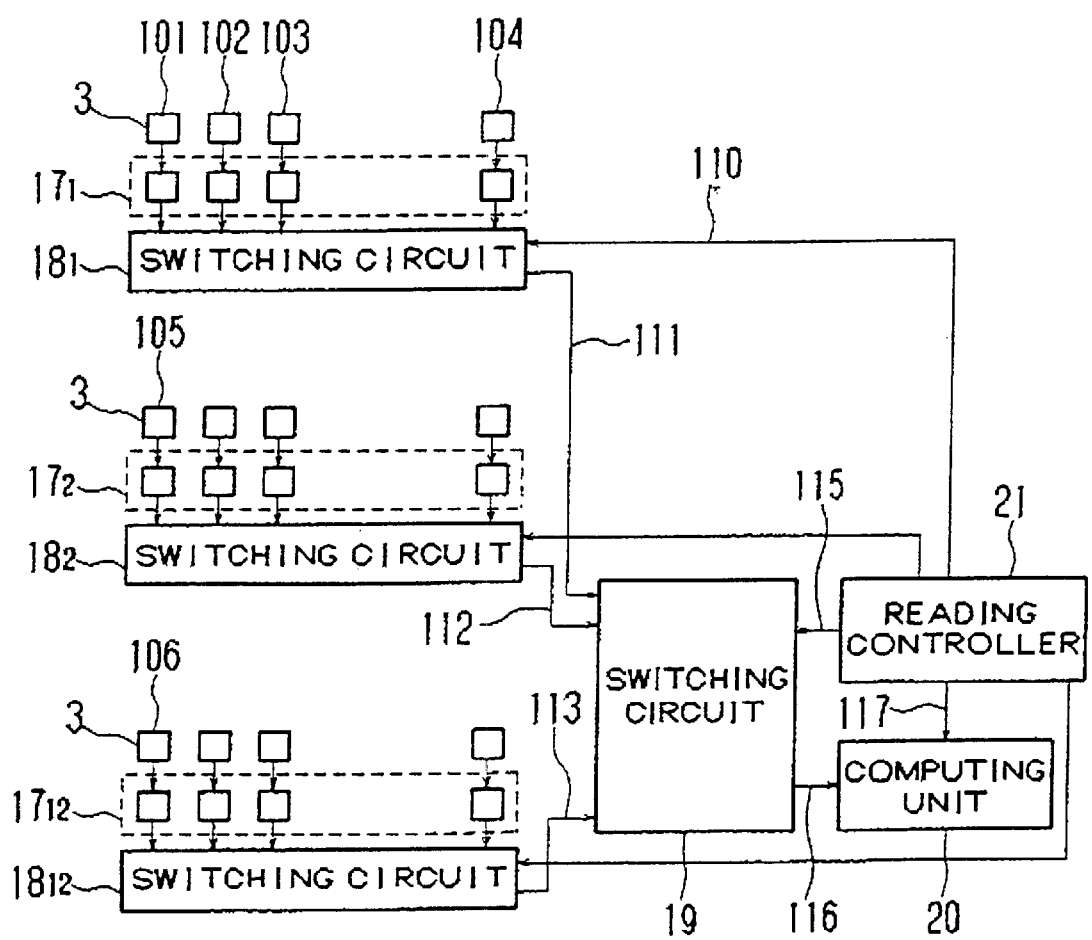
FIG. 8 is a block diagram illustrating a signal detecting circuit connected with the weight sensors according to the present invention.
Figure 9:
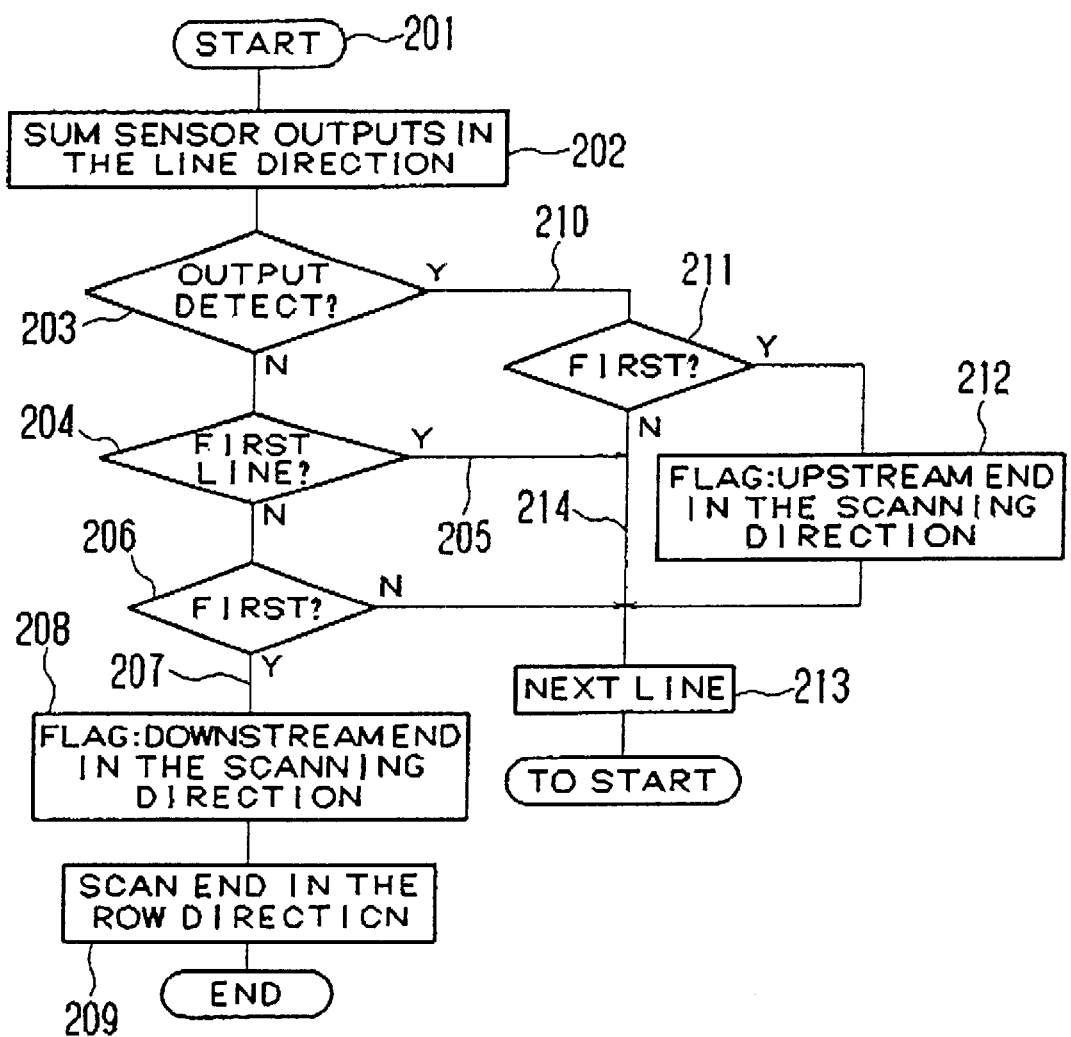
FIG. 9 is a flow diagram for processing the output of the weight sensors for identifying bottom form of the tray according to the present invention.

The line of the weight sensors 3 (101, 102, 103, and 104) shown in FIG. 8 corresponds to the sensor line $x_1$ shown in FIG. 4, the line of the weight sensors 3 (right direction from 105) shown in FIG. 8 corresponds to the sensor line $x_2$ shown in FIG. 4, line of the weight sensors 3 (right direction from 106) shown in FIG. 8 corresponds to the sensor line $X_3$ shown in FIG. 4. The signal conditioners 17 have a structure corresponding to the principle of the weight sensors 3. For example, the signal conditioners 17 comprise the resistance bridge circuit for the weight sensors 3 having resistance change. The resistance bridge circuit transforms the output from the weight sensors 3 to voltage. As shown in FIG. 8, the signal conditioners $17_1$ connect its output with the switching circuit $18_1$. The switching circuit $18_1$ is turned according to the command signal 110 from the reading controller 21, so that the output signals from the weight sensors 3 (101 to 104) are transmitted successively from the signal line 110 of the switching circuit $18_1$. Also, the switching circuits $18_2$ is turned according to the command signal 110 from the reading controller 21, so that the output signals from the weight sensors 3 (right direction from 105) are transmitted successively from the signal line 112 of the switching circuit $18_2$. In the same manner, the switching circuits $18_{12}$ is turned according to the command signal 110 from the reading controller 21, so that the output signals from the weight sensors 3 (right direction from 106) are transmitted successively from the signal line 113 of the switching circuit $18_{12}$.

The signal lines 111, 112 and 113 are connected with the other switching circuit 19. The switching circuit 19 performs switching according to the command signal from the reading controller 21.

In operation, the switching circuit 19 outputs signal of each weight sensor 3 successively and the reading controller 21 transmits switching command information concerning the command signal transmitted to the each switching circuit $18_1$, $18_2$ and $18_{12}$. The computing unit 20 performs calculation according to the signal of each weight sensor 3 and the switching command information so as to sum the values of all signals of the weight sensors 3 and to determine the level of all signals of the weight sensors 3 whereby the weight, form and size of the article put on the weight sensors 3 can be detected.

The form of the bottom of the tray 7 is rectangle, but the weight sensors 3 with low level output, shown with a white dot, is included in the line or the row including the weight sensors 3 with high level output, shown with a mesh dot. This means, as discussed above, that the bottom of the tray 7 is not completely flat, so some portions of the bottom of the tray 7 step over the weight sensors 3. In case such state occurs, the envelop is provided in the line and row direction by calculation whereby the method for sensing the form of the article according to the present invention will be able to assume the existent area of the bottom of tray 7.

FIG. 9 is a flow diagram for processing the output of the weight sensors 3 for identifying the bottom form of the tray 7 according to the present invention. The process by the computing unit 20 begins from start 201. At first, the output from sensors 3 in $x_1$ line is summed (202). This process is executed by the switching operation of the switching circuit $18_1$. The computing unit 20 determines whether the summed value is "0" or not (203). The computing unit 20 determines whether the detected line is the first line or not (204) in case the "0" was determined in step 203. In case the detected line was the first line, process for next line start (205) because the line with high level output will be able to be expected. In case the detected line was not the first line, the computing unit 20 determines whether the summed value resulted "0" for the first time or not (206). In case the summed value resulted "0" for the first time (207), it means that detected line first passed through the article. Thus, the computing unit 20 sets the flag that means the detected line is most downstream line in row direction (208), and then the scanning operation ends (209).

In case the "0" was not determined in step 203 (210), the computing unit 20 investigates whether the summed value become not "0" for the first time or not from scan started (211). In case the detected line was the first line, the computing unit 20 sets the flag that means the detected line is most upstream line in row direction (212) and then the process for next line will start (213). In case the detected line was not the first line (211), the computing unit 20 will detect (214) next line (213) because the result of not first line means the article is on the way of scanning. The process for next line means returning to start (201).

The most upstream line in row direction (212) and the most downstream line in row direction (208) are detected with the above processes. The scanning process in line direction was described above. The scanning process in row direction also can be executed with changing the scanning direction. As a result of the scanning in row direction, the most upstream row in line direction and the most downstream row in line direction can be detected. Accordingly, the form and size of the article can be determined based on most upstream line in row direction, the most downstream line in row direction, the most upstream row in line direction, and the most downstream row in line direction.

The embodiments of the packaging machine according to the present invention are now explained with reference to FIGS. 10 and 11. The same parts as those in the former embodiments are designated by the same reference numerals, and are not again explained herein.

Figure 10:
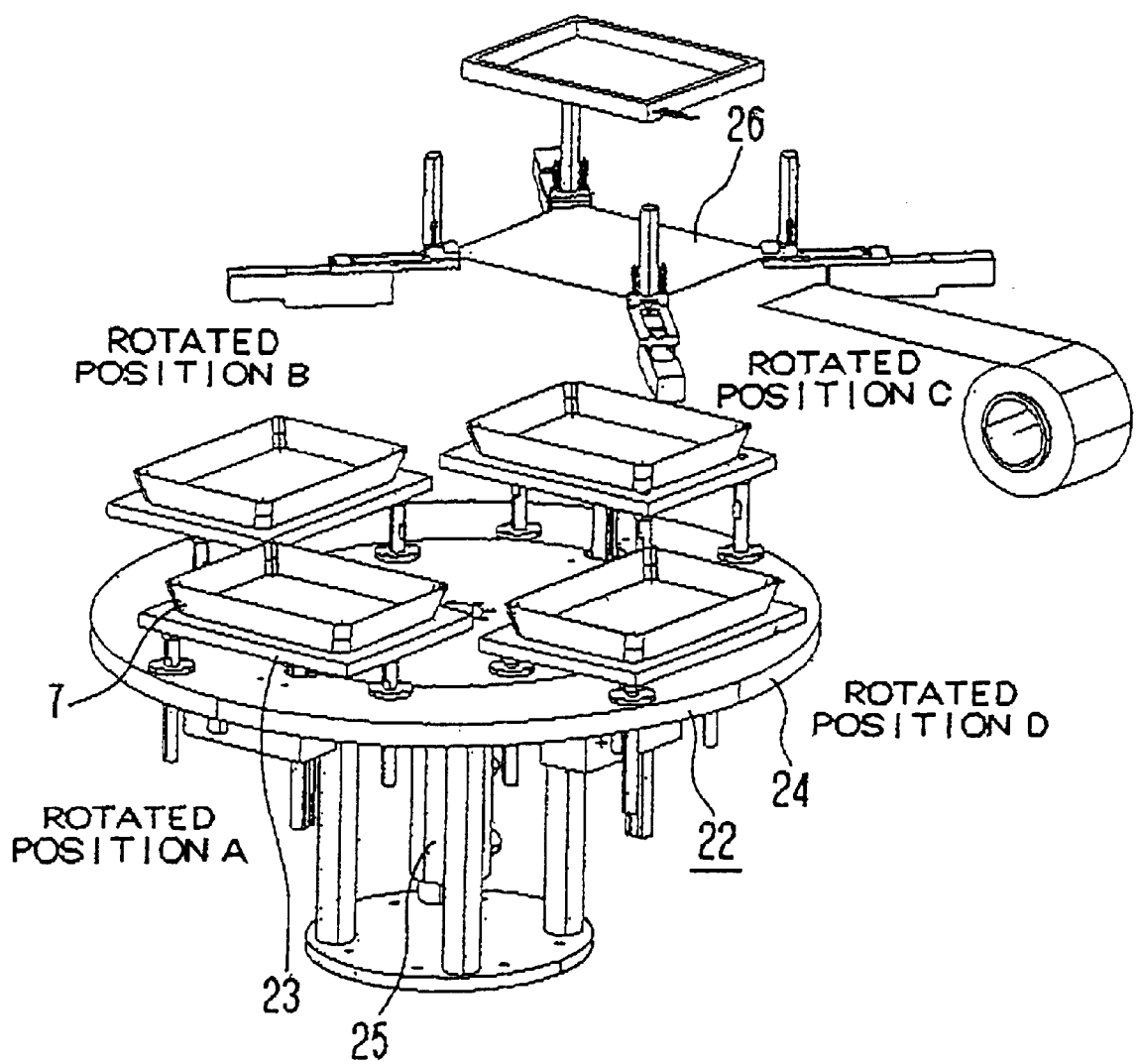
FIG. 10 is a schematic perspective view illustrating a mechanism of the packaging machine according to the present invention.
Figure 11:
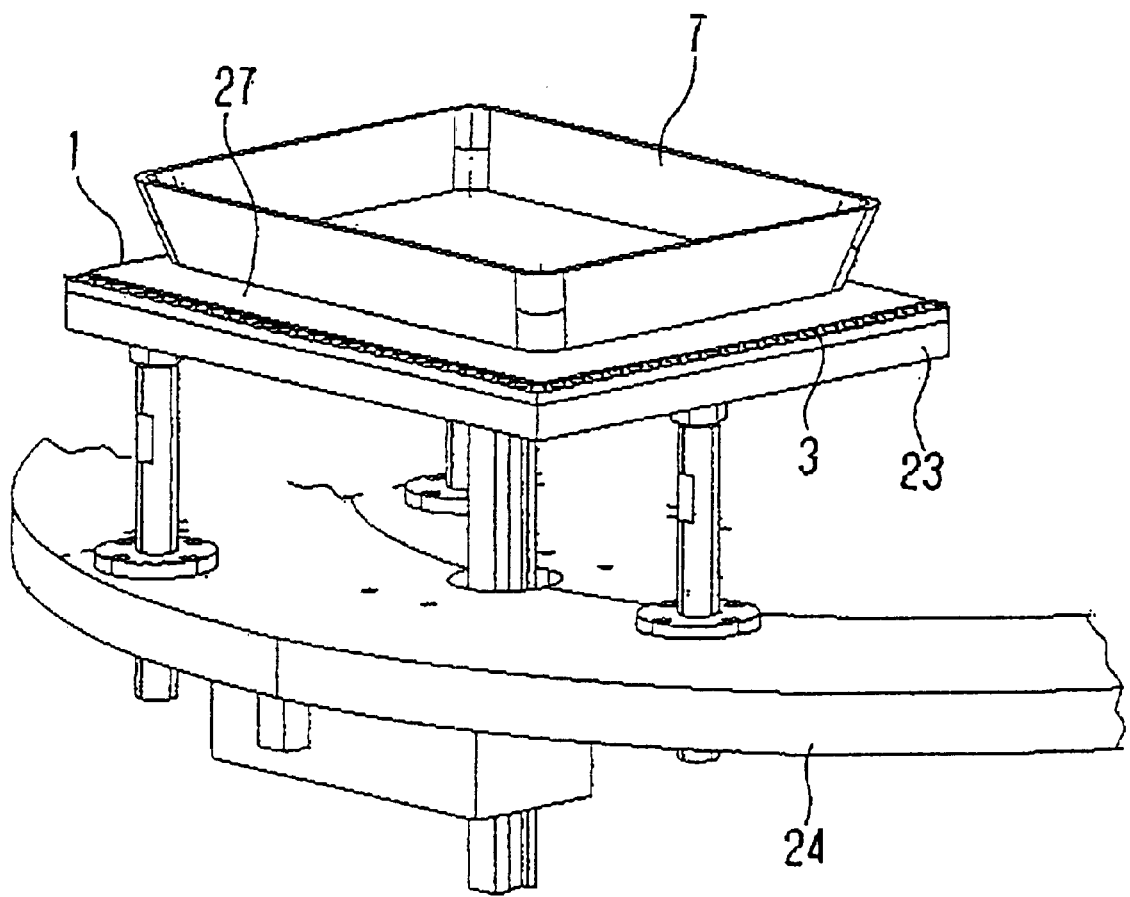
FIG. 11 is an enlarged perspective view illustrating a turntable of the packaging machine according to the present invention.

FIG. 10 shows a mechanism of the packaging machine 22 having turntable system according to the present invention. FIG. 11 shows a turntable 24 of the packaging machine 22 according to the present invention.

There is provided a rotatable turntable 24 driven by a rotary drive mechanism 25. A table 23 for putting the goods with tray 7 is provided on the turntable 24 so as to be capable of rising and lowering. The tray 7 is put on the table 23 at a rotated position A. The table 23 rotates successively to a rotated position B for weight and form sensing position from the rotated position A, to a rotated position C for packaging position with the film from the rotated position B, to a rotated position D for taking out position of the packaged tray 7 from the rotated position C.

The base 1 of the weight and form sensing apparatus is attached on the table 23. The base 1 of this embodiment differs in some portions to the base 1 of former embodiments. That is, a seat 27 having same size to the table 23 is provided on the weight sensors 3 arranged in the matrix pattern. The common electrodes are not disposed on the substrate 2 directly, but each common electrode is provided under the seat 27 so as to touch each weight sensor 3. Thus, the seat having a relatively flat surface forms the surface of the weight sensors 3, so that dust on the weight sensor 3 can be easily eliminated.

The weight and form sensing apparatus, the base 1 of which is attached on the table 23, weighs and measures form and size of the article put on the table 23, in the same manner described above, immediately after the tray 7 was put on the table 23 or while the turntable 24 stopped at the rotated position B. Information about weight, form and size of the article will transmit to a label printer, a labeling machine or the like.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein. The present application is based on Japanese Priority Documents Hei 11-143320 filed on May 24, 1999 and 2000-144420 filed on May 17, 2000, the content of which are rated herein by reference.

What is claimed is:

1. A weight and form sensing apparatus, comprising:
   a base;
   plural weight sensors each having a load receiving portion on a top and disposed on the base;
   a weighing device configured to sum an output value of each weight sensor to weigh an article put on the weight sensors;
   a form measuring device configured to determine an existence of the load on each weight sensor based on an output signal of each weight sensor to identify a bottom form and size of the article; and
   a flexible member provided on the load receiving portion of each weight sensor and configured to undergo a deformation based on the load of the article such that a deformation of the bottom form and size of the article are determined by the form measuring device.

2. A weight and form sensing apparatus, comprising:
   a base;
   plural weight sensors each having a load receiving portion on a top and disposed on the base;
   means for summing an output value of each weight sensor to weigh an article put on the weight sensors;
   means for determining an existence of the article on each weight sensor based on an output signal of each weight sensor to identify a bottom form and size of the article; and
   flexible means provided on the load receiving portion of each weight sensor and for undergoing a deformation based on the load of the article such that a deformation of the bottom form and size of the article are determined by the determining means.

3. A weight and form sensing apparatus according to claims 1 or 2, wherein each weight sensor comprises:
   a pair of electrodes provided on the base;
   a pair of conductive elastic members provided on the electrodes in same height; and
   a thin conductive member provided on the elastic members to connect the elastic members to each other.

4. A weight and form sensing apparatus according to claims 1 or 2, wherein each weight sensor comprises:
   a common electrode provided on the base;
   an insulation layer covered on the common electrode;
   a contact hole formed in the insulation layer;
   an individual electrode provided on the insulation layer; and
   a conductive elastic member having one end connected with the common electrode via the contact hole and another end connected with the individual electrode, wherein a resistance value of the elastic member changes as to a strain of the elastic member so that the weight sensors sense weight based on the resistance values of the elastic members.

5. A weight and form sensing apparatus according to claims 1 or 2, wherein each weight sensor comprises:
   an individual electrode provided on the base;
   a conductive elastic member provided on the individual electrode; and
   a common electrode provided on the conductive elastic member,
   wherein the weight and form sensing apparatus further comprises a seat configured to cover the weight sensors, and
   wherein a resistance value of the elastic member changes as to a strain of the elastic member so that the weight sensors sense weight based on the resistance values of the elastic members.

6. A packaging machine, comprising:
   a weight and form sensing apparatus, including:
      a base;
      weight sensors each having a load receiving portion on a top and disposed on the base;
      a weighing device configured to sum an output value of each weight sensor to weigh an article put on the weight sensors; and
      a form measuring device configured to determine an existence of a load on each weight sensor based on an output signal of each weight sensor to identify a bottom form and size of the article,
      wherein the article is packaged in a tray with a film after the weight and form of the article is sensed by the weight and form sensing apparatus.

7. A weight and form sensing apparatus, comprising:
   a base;
   plural weight sensors each having a load receiving portion on a top and disposed on the base;
   a weighing device configured to sum an output value of each weight sensor to weigh an article put on the weight sensors; and
   a form measuring device configured to determine an existence of the load on each weight sensor based on an output signal of each weight sensor to identify a bottom form and size of the article,
   wherein weight sensors disposed at a center area of a weight sensor arrangement are lower in height than weight sensors disposed at an outer area of the weight sensor arrangement.

8. A weight and form sensing apparatus, comprising:
   a base;
   plural weight sensors each having a load receiving portion on a top and disposed on the base;
   means for summing an output value of each weight sensor to weigh an article put on the weight sensors; and
   means for determining an existence of the article on each weight sensor based on an output signal of each weight sensor to identify a bottom form and size of the article,
   wherein the weight sensors disposed at a center area of a weight sensor arrangement are lower in height than weight sensors disposed at an outer area of the weight sensor arrangement.

9. A weight and form sensing apparatus according to claims 7 or 8, wherein each weight sensor comprises:
   a pair of electrodes provided on the base;
   a pair of conductive elastic members provided on the electrodes in same height; and
   a thin conductive member provided on the elastic members to connect the elastic members to each other.

10. A weight and form sensing apparatus according to claims 7 or 8, wherein each weight sensor comprises:
   a common electrode provided on the base;
   an insulation layer covered on the common electrode;
   a contact hole formed in the insulation layer;
   an individual electrode provided on the insulation layer; and a conductive elastic member having one end connected with the common electrode via the contact hole and another end connected with the individual electrode, wherein a resistance value of the elastic member changes as to a strain of the elastic member so that the weight sensors sense weight based on the resistance values of the elastic members.

11. A weight and form sensing apparatus according to claims 7 or 8, wherein each weight sensor comprises:

an individual electrode provided on the base;

a conductive elastic member provided on the individual electrode; and a common electrode provided on the conductive elastic member, wherein the weight and form sensing apparatus further comprises a seat configured to cover the weight sensors, and wherein a resistance value of the elastic member changes as to a strain of the elastic member so that the weight sensors sense weight based on the resistance values of the elastic members.

* * * * *

UNITED STATES PATENT AND TRADEMARK OFFICE
CERTIFICATE OF CORRECTION

PATENT NO.    : 6,346,680 B1
DATED         : February 12, 2002
INVENTOR(S)   : Takahashi et al.

It is certified that error appears in the above-identified patent and that said Letters Patent is hereby corrected as shown below:

<u>Title page,</u>
Item [30], the Foreign Application Priority information should read:

-- [30]    Foreign Application Priority Data
May 24, 1999   (JP) ………………………….. 11-143320
May 17, 2000   (JP) ………………………….. 2000-144420 --

Signed and Sealed this

Eighteenth Day of June, 2002

*Attest:*

*Attesting Officer*

JAMES E. ROGAN
*Director of the United States Patent and Trademark Office*